United States Patent [19]

Meeker

[11] 4,422,241
[45] Dec. 27, 1983

[54] MARK LOCATOR AND METHOD OF USING SAME

[75] Inventor: David M. Meeker, Saratoga, Calif.

[73] Assignee: Champion International Corporation, Stamford, Conn.

[21] Appl. No.: 379,492

[22] Filed: May 18, 1982

Related U.S. Application Data

[63] Continuation of Ser. No. 116,908, Jan. 30, 1980, abandoned.

[51] Int. Cl.³ .............................................. G01B 5/14
[52] U.S. Cl. ................................. 33/1 BB; 33/174 R; 235/495
[58] Field of Search ................. 33/1 BB, 1 B, 174 G, 33/174 K, 174 B, 1 C; 73/156, 157; 235/495

[56] References Cited

U.S. PATENT DOCUMENTS

| | | | |
|---|---|---|---|
| 3,266,162 | 8/1966 | Burke | 33/174 G |
| 3,705,294 | 12/1972 | Kuehnle et al. | 235/495 |
| 3,760,506 | 9/1973 | Tudberry | 33/1 BB |
| 3,863,051 | 1/1975 | Wilcoxon | 235/495 |
| 4,149,070 | 4/1979 | Pastorius | 235/495 |

Primary Examiner—Charles E. Phillips
Attorney, Agent, or Firm—Evelyn M. Sommer

[57] ABSTRACT

A mark locator has a transparent plate with edge surfaces depending from the lower surface of the plate. Indicia is provided on the plate at predetermined locations relative to the edge surfaces. When the mark locator is placed upon the surface of an article having indicia, the mark locator visually indicates whether the indicia on the article is in compliance with the appropriate specifications therefor.

1 Claim, 6 Drawing Figures

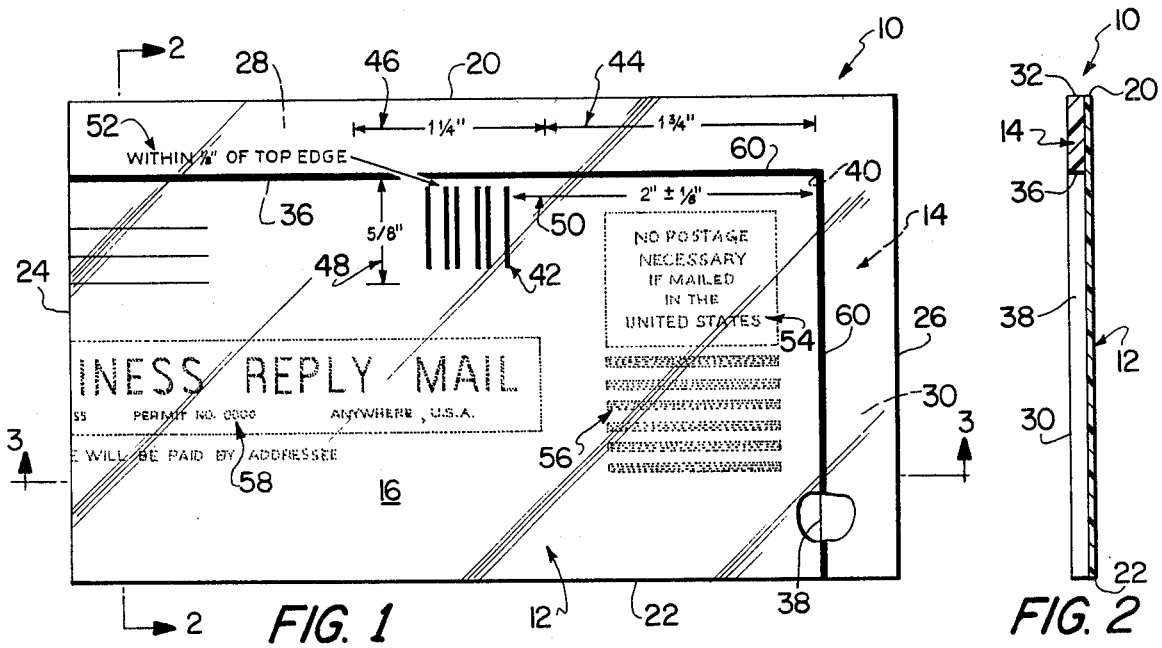
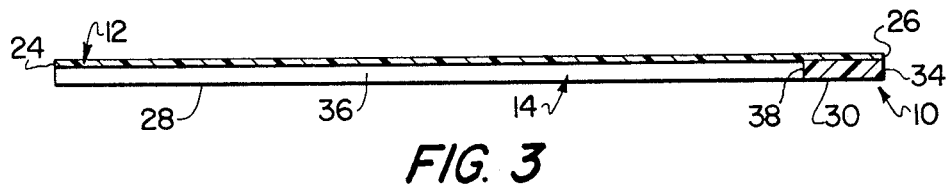
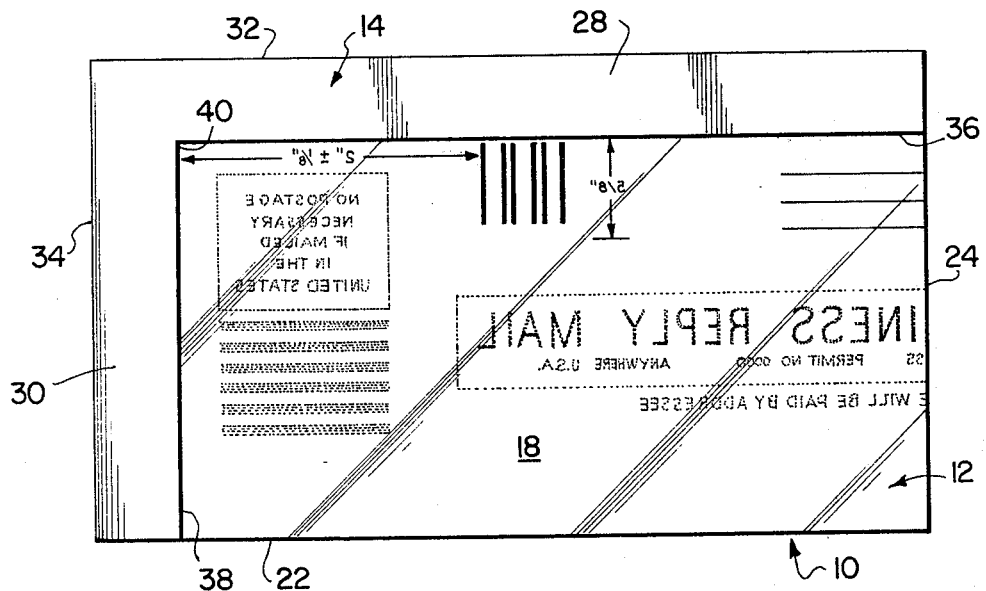

MARK LOCATOR AND METHOD OF USING SAME

This is a continuation of application Ser. No. 116,908, filed Jan. 30, 1980, now abandoned.

BACKGROUND OF THE INVENTION

The present invention relates to a mark locator and a method of using the mark locator to determine whether the markings on an article conform to the appropriate specifications. More particularly, the invention relates to a mark locator which, when placed on the surface of the article having markings to be checked, is easily located in a proper orientation relative to the article and gives an easily read visual indication of whether the markings satisfy the appropriate specifications.

In articles such as Business Reply Mail, markings are required which must be in a prescribed location and of prescribed dimensions. Failure to provide the markings as prescribed, may result in the markings failing to perform their intended tasks.

In particular, business reply mail, e.g., envelopes and postcards, must contain a Facing Identification Mark that must be provided in an area that measures ⅝ inch in height and 1¼ inches in length. This area is located along the top edge of the piece of business reply mail, begins 3 inches from the right edge of the piece, extends 1¼ inches to the right edge, and extends ⅝ inch downwardly from the top edge. The Facing Identification Mark is a vertical bar code in the top portion of the address side of the envelope or card and functions as an orientation mark for automatic facing and cancelling equipment.

The U.S. Postal Service provides negatives for the Facing Identification Mark. The postal service consumer has the responsibility of insuring that the Facing Identification Mark is accurately and properly reproduced in the prescribed area.

In view of the importance of the Facing Identification Mark formation and the large number of items requiring checking, a simple and inexpensive device and method for checking whether the marks placed on a piece of business reply mail conform to the postal service requirements is highly desirable. Such device and method are also necessary to adjust the printing machinery and to spot check the mail which already has been printed.

SUMMARY OF THE INVENTION

Accordingly, it is an object of the present invention to provide a device and method for checking the accuracy of markings on an article which is inexpensive, simle and quick.

Another object of the present invention is to provide a device for checking the accuracy of markings on an article which is inexpensive and simple to manufacture and of rugged and durable construction.

The foregoing objects are attained by a mark locator comprising transparent plate means having upper and lower surfaces, the upper and lower surfaces being parallel and planar, two planar, angularly oriented edge structures fixed to the plate means and lying in planes substantially perpendicular to a plane containing the lower surface, and indicia provided on the plate means at predetermined locations relative to the edge surfaces.

The foregoing objects are also attained by a method of checking whether markings formed on a surface of an article are formed and located within the limits of the appropriate specifications comprising providing a mark locator having a transparent plate means with parallel, planar upper and lower surfaces, two planar angularly oriented edge surfaces fixed to the plate means, lying in planes substantially perpendicular to a plane containing the lower surface and corresponding to edges of the article's surface, and indicia on the plate means at predetermined locations relative to the edge surfaces, which indicia corresponds to proper markings, and placing the mark locator on the surface of the article having the markings with the edges of the article abutting the edge surfaces of the mark locator.

By forming the mark locator and by performing the method of the present invention in this manner, a clear visual indication is provided to determine whether the examined markings comply with the appropriate standards. The edge surfaces of the mark locator properly position the article relative to the plate by engaging the corresponding edges of the article. Thereby, the indicia on the plate is properly located with respect to the appropriate location on the article being examined.

Other objects, advantages and salient features of the present invention will become apparent from the following detailed description, which taken in conjunction with the annexed drawings, discloses a preferred embodiment of the present invention.

As used in this application, the terms "upper" and "lower", are intended to facilitate the description of the mark locator. Thus, such terms are merely illustrative of the locator and are not intended to limit the locator to any specific orientation.

BRIEF DESCRIPTION OF THE DRAWINGS

Referring to the drawings which form a part of this original disclosure:

FIG. 1 is a top plan view illustrating a mark locator in accordance with the present invention;

FIG. 2 is a side elevational view in cross section taken along lines 2—2 of the mark locator of FIG. 1;

FIG. 3 is a front elevational view in cross section taken along lines 3—3 of the mark locator of FIG. 1;

FIG. 4 is a bottom plan view of the mark locator of FIG. 1;

DETAILED DESCRIPTION OF THE PREFERRED EMBODIMENT OF THE INVENTION

Figure 5:
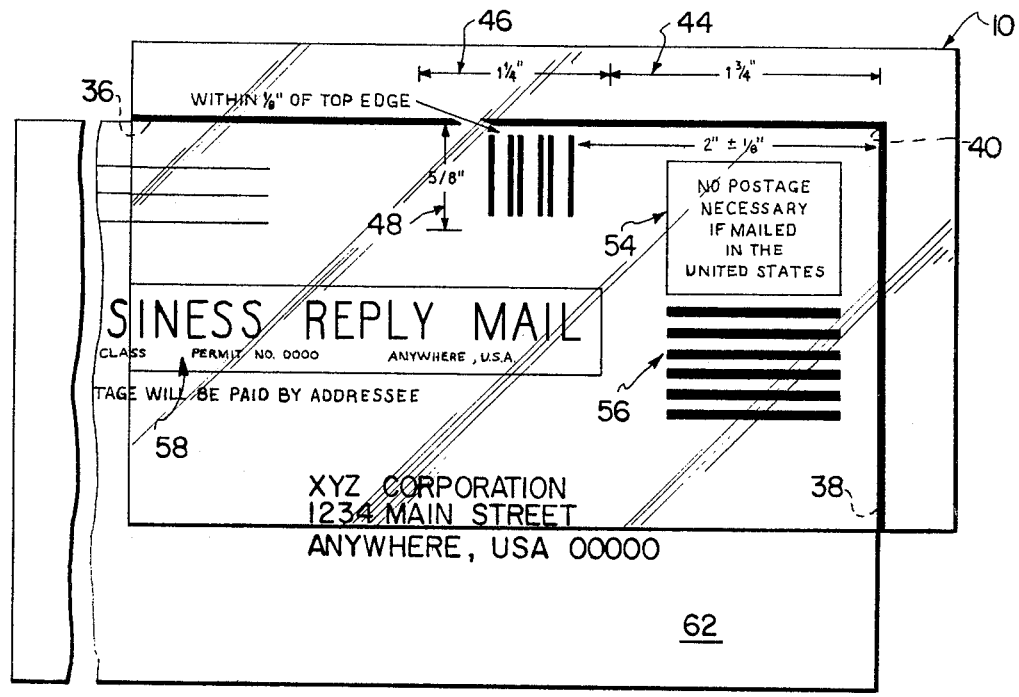
FIG. 5 is a top plan view illustrating the mark locator of FIG. 1 placed on a business reply card which complies with U.S. Postal Service specifications.

Referring initially to FIGS. 1–4, the mark locator 10 comprises two main portions, a transparent plate 12 and an edge structure 14. The plate 12 and the edge structure 14 are each formed of plastic.

The plate 12 is rectangular with planar, parallel upper and lower surfaces 16, 18, respectively, and with a top edge 20, a bottom edge 22, and side edges 24, 26. In the embodiment illustrated, the edges 20, 22 are longer than the edges 24, 26.

The edge structure 14 comprises an L-shaped member of rectangular cross section fixed to the lower surface 18 of the plate 12, e.g., by a suitable adhesive. A first leg 28 of the edge structure 14 extends along the top edge 20 of the plate 12. A second, shorter leg 30 extends along the side edge 26 of the plate 12. The first and second legs 28, 30 of the edge structure 14 may be formed as a unitary piece or two or more separate pieces which are attached to the plate 12. The legs 28, 30 terminate at the edges 24, 22, respectively, of the plate 12. The outer edges 32, 34 of the edge structure 14 are aligned and coplanar with the edges 20, 24, respectively, of the plate 12.

The inner edge surfaces 36, 38 of the edge structure 14 are located within the periphery of the plate 12 formed by the edges 20, 26, 22, 24. The edge surfaces 36, 38 are located in planes perpendicular to the plane containing the lower surface 18 of the plate 12. Additionally, the surfaces 36, 38 are planar and perpendicular, and meet at corner 40.

By forming the edge structure 14 in this manner, the inner edge surfaces 36, 38 form abutment surfaces which extend perpendicularly from the lower surface 18 of the plate 12 and are fixedly located relative to the plate 12.

As best seen in FIG. 1, various sets of indicia are provided on the plate 12 at predetermined or prescribed locations relative to the edge surfaces 36, 38. A replica of the Facing Identification Mark 42, which comprises a series of parallel vertical lines, is located in a rectangular area defined at its top margin by the edge surface 36, at its righthand margin by the dimension lines 44 marking a distance of 1¾ inches from the edge surface 38, at its lefthand margin by the dimension lines 46 marking a distance of 1¼ inches from the righthand margin of the area, and at its bottom margin by the dimension lines 48 marking a distance of ⅝ inch from the edge surface 36. Thus, the Facing Identification Mark area is defined by the dimension lines 44, the dimension lines 46, the dimension lines 48, and the edge surface 36. The edge surfaces 36, 38 corresond to the appropriate edges of an envelope or card.

The dimension lines 50 indicate the preferred spacing of the Facing Identification Mark from the edge surface 38 to locate the mark 42 in the center of this area. Likewise, the indicia 52 indicates an optimum location for the mark 42 to locate it centrally within the proscribed area.

The "NO POSTAGE NECESSARY IF MAILED IN THE UNITED STATES" legend 54, the horizontal bars 56, and the "BUSINESS REPLY MAIL" and "POSTAGE WILL BE PAID BY ADDRESSEE" legends 58 assist the user of the locator 10 in orienting a piece of mail properly relative to the locator 10. The plate 12 also has an L-shaped line 60 indicating, at the innermost portions thereof, the location of the edge surfaces 36, 38.

Figure 6:
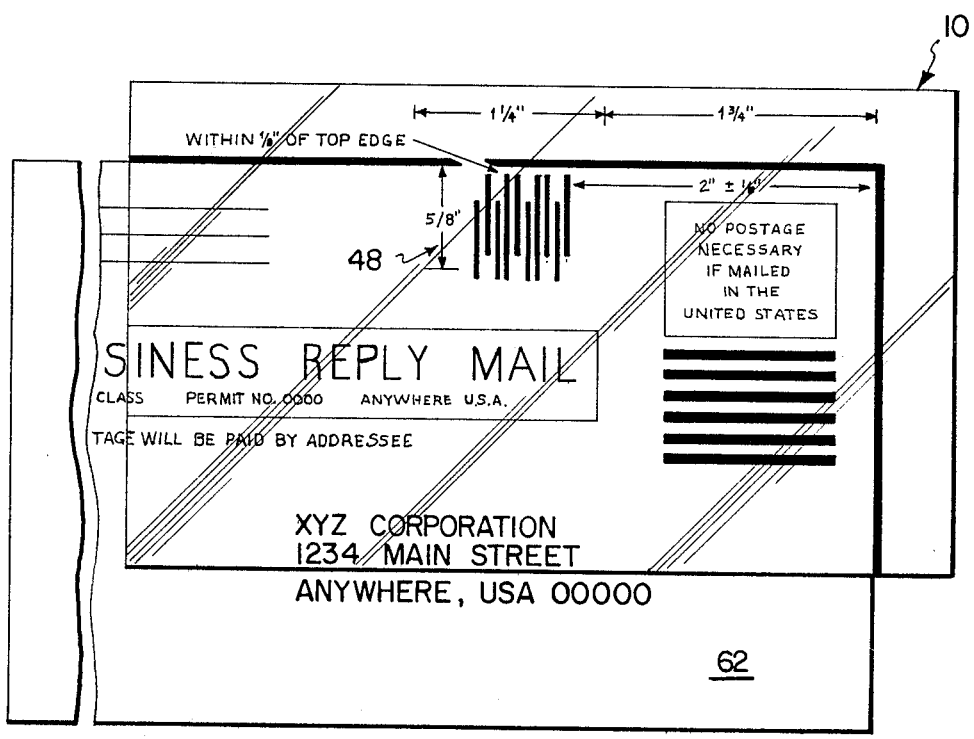
FIG. 6 is a top plan view illustrating the mark locator of FIG. 1 placed on a business reply card which is not in compliance with the U.S. Postal Service specifications.

As illustrated in FIGS. 5 and 6, the mark locator 10 is used by placing the locator on the printed surface of a business reply card 62. The legends 54, 58 and the horizontal bars 56 of the mark locator 10 are oriented to overlie generally the corresponding indicia on the card 62. This locates the appropriate corner of the card 62 adjacent the corner 40. Thereafter, the card 62 is slid until the edges of the card abut the edge surfaces 36, 38.

Once the appropriate edges of the card 62 abut the edge surfaces 36, 38, a clear visual indication demonstrates whether the Facing Identification Mark has been properly formed on the business reply card 62. The dimension lines 44, 46, 48 indicate whether the mark is within the prescribed area. The Facing Identification Mark 42 on the plate 12 may also be used to check the spacing of the lines of the Facing Identification Mark on the card by sliding the plate 12 over the card 62 attempting to align the Facing Identification Marks on the plate 12 and the card 62.

In FIG. 5, the card 62 has a Facing Identification Mark which complies with the postal service regulations both as to form and location since the Facing Identification Mark is within the prescribed area. In FIG. 6, the card 62 has a Facing Identification Mark which fails to satisfy the requirements in that the mark extends below the lower limit (indicated by dimension lines 48) of the prescribed area for the Facing Identification Mark.

By using the mark locator 10 in this manner, a determination of whether the Facing Identification Mark on a business reply envelope or business reply card complies with the specifications required by the U.S. Postal Service is simply and inexpensively accomplished.

While a particular embodiment has been chosen to illustrate the invention, it will be understood by those skilled in this art that various changes and modifications can be made therein without departing from the scope of the invention as defined in the appended claims.

What is claimed is:

1. A mark locator having indicia thereon for verifying conformity of markings of a mail article as being within the limits of postal specifications, said markings comprising a series of parallel lines of predetermined width, length and spacing, comprising:

a single rectangular transparent plate having opposed top and bottom edges and opposed side edges and having an upper and a lower surface, said upper and lower surfaces being parallel and planar;

first and second planar, perpendicularly oriented edge surfaces comprising rectangular bar members fixed to the lower surface of said plate adjacent and parallel to two adjacent edges of said plate and lying in first and second planes, respectively, substantially perpendicular to a plane containing said lower surface; and indicia provided on said plate at predetermined locations defining an area relative to said first and second edge surfaces, said plate having coextensive first and second dimension lines of predetermined lengths parallel to said first edge surface and perpendicular to said second edge surface, said plate having a third dimension line of predetermined length parallel to said second edge surface and perpendicular to said first edge surface, said third dimension line extending from said first edge surface for a predetermined length and being in perpendicular relationship to said coextensive first and second dimension lines, said first dimension line extending from said second edge surface for a predetermined length to a point where the said second dimension line starts, said indicia comprising a replica of said markings, said replica being located in an area defined by said first edge surface, the length of said second dimension line and the length of said third dimension line, said plate having a pair of lines which overlie said first and second edge surfaces to define the position thereof.

* * * * *